US010764226B2

(12) United States Patent
Goldstein

(10) Patent No.: US 10,764,226 B2
(45) Date of Patent: Sep. 1, 2020

(54) MESSAGE DELIVERY AND PRESENTATION METHODS, SYSTEMS AND DEVICES USING RECEPTIVITY

(71) Applicant: Staton Techiya, LLC, Delray Beach, FL (US)

(72) Inventor: Steven Wayne Goldstein, Delray Beach, FL (US)

(73) Assignee: Staton Techiya, LLC, Delray Beach, FL (US)

( * ) Notice: Subject to any disclaimer, the term of this patent is extended or adjusted under 35 U.S.C. 154(b) by 216 days.

(21) Appl. No.: 15/406,776

(22) Filed: Jan. 15, 2017

(65) Prior Publication Data

US 2017/0208027 A1    Jul. 20, 2017

Related U.S. Application Data

(60) Provisional application No. 62/279,406, filed on Jan. 15, 2016.

(51) Int. Cl.
  *G06F 15/16* (2006.01)
  *H04L 12/58* (2006.01)
(52) U.S. Cl.
  CPC .................. *H04L 51/26* (2013.01)
(58) Field of Classification Search
  CPC ....... H04L 51/12; H04L 67/22; H04L 67/306; H04L 63/0861; H04L 51/10; H04L 51/20; H04L 51/26; H04W 24/08; H04W 4/14; H04W 4/16
  See application file for complete search history.

(56) References Cited

U.S. PATENT DOCUMENTS

| 6,442,402 | B2 | 8/2002 | Benz et al. |
| 7,756,281 | B2 | 7/2010 | Goldstein et al. |
| 8,047,207 | B2 | 11/2011 | Perez et al. |
| 8,194,864 | B2 | 6/2012 | Goldstein et al. |
| 8,199,919 | B2 | 6/2012 | Goldstein et al. |
| 8,208,644 | B2 | 6/2012 | Goldstein et al. |
| 8,208,652 | B2 | 6/2012 | Keady |

(Continued)

OTHER PUBLICATIONS

David Da He et al.; An Ear-Worn Vital Signs Monitor, Transactions on Biomedical Engineering; Dec. 29, 2015, pp. 1-2.

(Continued)

*Primary Examiner* — Suraj M Joshi
*Assistant Examiner* — Ayele F Woldemariam
(74) *Attorney, Agent, or Firm* — Akerman LLP; Peter A. Chiabotti; Mammen (Roy) P. Zachariah, Jr.

(57) ABSTRACT

A method, system or device includes one or more sensors for measuring a multimodal metric, a memory having computer instructions, and one or more processors operatively coupled to the one or more sensors and the memory. The one or more processors when executing computer instructions cause the one or more processors to perform operations such as analyzing the multimodal metric to provide an analysis and determine a receptivity to a message, and delivering or receiving or presenting the message at a period of time when the receptivity is over a predetermined threshold based on the analysis. Receptivity to a message can be measured in many different ways including the use of the one or more sensors such one or more microphones used for determining a cognitive load of a recipient.

14 Claims, 5 Drawing Sheets

(56) References Cited

U.S. PATENT DOCUMENTS

| | | |
|---|---|---|
| 8,219,554 B2 | 7/2012 | Angell et al. |
| 8,221,861 B2 | 7/2012 | Keady |
| 8,229,128 B2 | 7/2012 | Keady |
| 8,251,925 B2 | 8/2012 | Keady et al. |
| 8,312,960 B2 | 11/2012 | Keady |
| 8,437,492 B2 | 5/2013 | Goldstein et al. |
| 8,550,206 B2 | 10/2013 | Keady et al. |
| 8,554,350 B2 | 10/2013 | Keady et al. |
| 8,600,067 B2 | 12/2013 | Usher et al. |
| 8,631,801 B2 | 1/2014 | Keady |
| 8,657,064 B2 | 2/2014 | Staab et al. |
| 8,678,011 B2 | 3/2014 | Goldstein et al. |
| 8,718,313 B2 | 5/2014 | Keady |
| 8,769,557 B1* | 7/2014 | Terrazas ............... G06Q 30/02 725/12 |
| 8,848,939 B2 | 9/2014 | Keady et al. |
| 8,917,880 B2 | 12/2014 | Goldstein et al. |
| 8,992,710 B2 | 3/2015 | Keady |
| 9,113,267 B2 | 8/2015 | Usher et al. |
| 9,123,323 B2 | 9/2015 | Keady |
| 9,138,353 B2 | 9/2015 | Keady |
| 9,185,481 B2 | 11/2015 | Goldstein et al. |
| 9,216,237 B2 | 12/2015 | Keady |
| 9,539,147 B2 | 1/2017 | Keady et al. |
| 9,757,069 B2 | 9/2017 | Keady et al. |
| 9,781,530 B2 | 10/2017 | Usher et al. |
| 9,843,854 B2 | 12/2017 | Keady |
| 10,012,529 B2 | 7/2018 | Goldstein et al. |
| 10,190,904 B2 | 1/2019 | Goldstein et al. |
| 2001/0003095 A1 | 6/2001 | Benz et al. |
| 2005/0197843 A1* | 9/2005 | Faisman et al. ............ 704/276 |
| 2009/0020516 A1 | 1/2009 | Niiyama et al. |
| 2009/0071487 A1 | 3/2009 | Keady |
| 2010/0153180 A1* | 6/2010 | Angell et al. ......... G06Q 99/00 706/52 |
| 2010/0153389 A1 | 6/2010 | Angell et al. |
| 2010/0223341 A1 | 9/2010 | Manolescu et al. |
| 2010/0241256 A1 | 9/2010 | Goldstein et al. |
| 2010/0280983 A1* | 11/2010 | Cho et al. ........................ 706/46 |
| 2012/0096139 A1* | 4/2012 | Cackowski et al. .... G06F 15/16 709/223 |
| 2013/0098706 A1 | 4/2013 | Keady |
| 2013/0149192 A1 | 6/2013 | Keady |
| 2013/0205311 A1* | 8/2013 | Ramaswamy et al. ...................... H04N 21/44213 725/9 |
| 2014/0003644 A1 | 1/2014 | Keady et al. |
| 2014/0026665 A1 | 1/2014 | Keady |
| 2014/0223462 A1 | 8/2014 | Almone et al. |
| 2014/0373854 A1 | 12/2014 | Keady |
| 2015/0003595 A1* | 1/2015 | Yaghi ................. G06Q 10/063 379/85 |
| 2016/0015568 A1 | 1/2016 | Keady |
| 2016/0192077 A1 | 6/2016 | Keady |
| 2016/0295311 A1 | 10/2016 | Keady et al. |
| 2016/0300135 A1* | 10/2016 | Moudy ................. G06F 16/244 |
| 2017/0134865 A1 | 5/2017 | Goldstein et al. |
| 2018/0054668 A1 | 2/2018 | Keady |
| 2018/0132048 A1 | 5/2018 | Usher et al. |
| 2018/0220239 A1 | 8/2018 | Keady et al. |
| 2019/0082272 A9 | 3/2019 | Goldstein et al. |

OTHER PUBLICATIONS

Florian Schulze et al.; Studying How Character of Conversation Affects Personal Receptivity . . . ; CHI Apr. 26, 2014-May 1, 2014.

Preben Kidmose et al.; Ear-EEG, A Novel Brain monitoring methodology; Imperial College London, Aarhus University, pp. 1-29.

Nitin Sawhney et al.; Nomadic Radio: Speech and Audio interation . . . ; ACM Transactions on Computer . . . , vol. 7, No. 3, Sep. 2000, pp. 353-383.

Joel E. Fischer; Understanding Receptivity to Interruptions in Mobile Human-Computer Interaction; Univ. of Nottingham, Oct. 2011, 341 pages.

* cited by examiner

FIG. 3

Inference Engine/Analysis of Inputs to determine: 22
- Cognitive Load
  - existence of speech and context/cognitive load/receptivity
  - Receptivity to a particular message and/or message format
  - measure intention to adopt message directive or suggestion
- Use acoustics/microphones to analyze recipient user speech and ambient speech or speech in the wild which can include speaker ID
  - analyze speech and speech in the wild for words, meaning, content, sentiment, mood
  - analyze acoustics for non-speech context (sound signatures indicating a particular context (clicking turn indicator, siren, whispering, screaming, etc.)
- use biometric sensors to measure heart rate, blood pressure, EEG, BCG, PPG, mood, etc.
- use location sensors, motion sensors, proximity sensors, beacons to determine context for appropriateness of presenting messages or of a particular format of message
- use recipient profile for message format preferences and temporal delivery/presentation preferences
- mine and use data from recipient applications and services such as calendar, email, SMS, chat, IM, voicemail, social network (likes, dislikes, buddy lists), web service, browser, maps, navigation services, restaurant rating service, movie rating service, or other device, network, or web application to infer context, receptivity, and state of mind of recipient
- mine and use data from online businesses including purchase histories, browsing histories, wish lists, shopping cart entries (whether items are purchased or not), etc
- mine and use data from merchant services, banks, and other financial institutions
- track and correlate subsequent behavior to presentation or delivery of messages including confirmation of receptivity to a particular message or a particular message format or message type or delivery mode or a message characteristic using one or more of acoustics, biometric sensors, location sensors, motion sensors, proximity sensors, beacons, changes to recipient profiles, data from recipient applications or services or from merchant services, banks or other financial institutions Note: Message type or format can include, but is not limited to: visual messages, audio messages, audio-visual messages, videos, still images, textual messages Message characteristic can include, but is not limited to: gender, color, volume, frequency, high motion video, low motion video, static image, or a genre.

40

MESSAGE DELIVERY AND PRESENTATION METHODS, SYSTEMS AND DEVICES USING RECEPTIVITY

CROSS REFERENCE TO RELATED APPLICATIONS

This Application is a utility patent application that claims the priority benefit of Provisional Patent Application No. 62/279,406 entitled "MESSAGE DELIVERY AND PRESENTATION methods, Systems and devices USING RECEPTIVITY" filed on Jan. 15, 2016, the entire contents of which is incorporated herein by reference in its entirety.

FIELD

The present embodiments relate to message delivery and presentation methods, systems, and device, and more particularly to method, systems and devices using receptivity.

BACKGROUND OF THE INVENTION

Interruptions in modern life have proliferated with the adoption of mobile information technology and services. Some schemes have been incorporated in mobile devices to alleviate inappropriate or inopportune interruptions based on a recipient's context, but many other schemes focus on the context of the sender. A sender can set a priority level to their messages or set a priority to a certain type of message based on bandwidth considerations or other contextual factors based on location. A sender can also have certain message delivery features disabled based on their mobile context. For example, many vehicles disable the caller or sender's ability to make a phone call if the device (or the vehicle that the device is in) is found to be in motion. A recipient may also have certain message delivery features disabled if the device or vehicle is found to be in motion.

Existing systems have ignored many factors that go into consideration in sending and receiving messages (which can include texts, SMS messages, phone calls, video call, images, etc.) at a most opportune time and at a context that would be most welcomed and received by a recipient.

SUMMARY

The present embodiments can be embodied in a system, including one or more sensors for measuring a multimodal metric, a memory having computer instructions, and one or more processors operatively coupled to the one or more sensors and the memory. The one or more processors when executing the computer instructions cause the one or more processors to perform operations such as analyzing the multimodal metric to provide an analysis and determine a receptivity to a message, and delivering or receiving or presenting the message at a period of time when the receptivity is over a predetermined threshold based on the analysis. Receptivity to a message can be measured in many different ways including the use of the one or more sensors such one or more microphones used for determining a cognitive load of a recipient. In some embodiments, the one or more sensors can include at least a microphone for determining an existence of speech and for determining a context or a cognitive load. In yet other embodiments, the one or more sensor can include at least a microphone and a biometric sensor for determining the cognitive load.

In some embodiments, the one or more sensors includes at least an acoustic sensor that operates cooperatively with at least one of a calendar, a texting memory, an email memory, a voicemail memory, or a location sensor to determine a state of being or a cognitive load of a message recipient. In some embodiments, the system includes the one or more processors further tracking responses to the receipt of the message and ranking the receptivity of a type or a characteristic of the message. The type of message can be at least one of a visual message, a audio message, an audiovisual message, or a textual message and a characteristic of the message can be at least one of a gender, a color, a volume, a frequency, a high motion, a low motion, a static image, or a genre.

In some embodiments, the one or more processors form an inference engine that provides a confidence level of a receptiveness of a user to receive a presentation of a message of a particular format at a particular time based on contexts inferred from the multimodal metrics. In some embodiments, the one or more processors form an inference engine that provides a confidence level of a receptiveness of a user to receive a presentation of a message of a particular format at a particular time based on contexts inferred from the multimodal metrics and further tracks and correlates the receptiveness based on subsequent multimodal inputs to update the confidence level.

BRIEF DESCRIPTION OF THE DRAWINGS

The invention may be understood from the following detailed description when read in connection with the accompanying drawing. It is emphasized, according to common practice, that various features of the drawings may not be drawn to scale. On the contrary, the dimensions of the various features may be arbitrarily expanded or reduced for clarity. Moreover, in the drawing, common numerical references are used to represent like features. Included in the drawing are the following figures:

FIG. 3 is a block diagram of an inference engine as may be used in the system of FIG. 2 in accordance with the present embodiments;

DETAILED DESCRIPTION OF THE INVENTION

Figure 1:
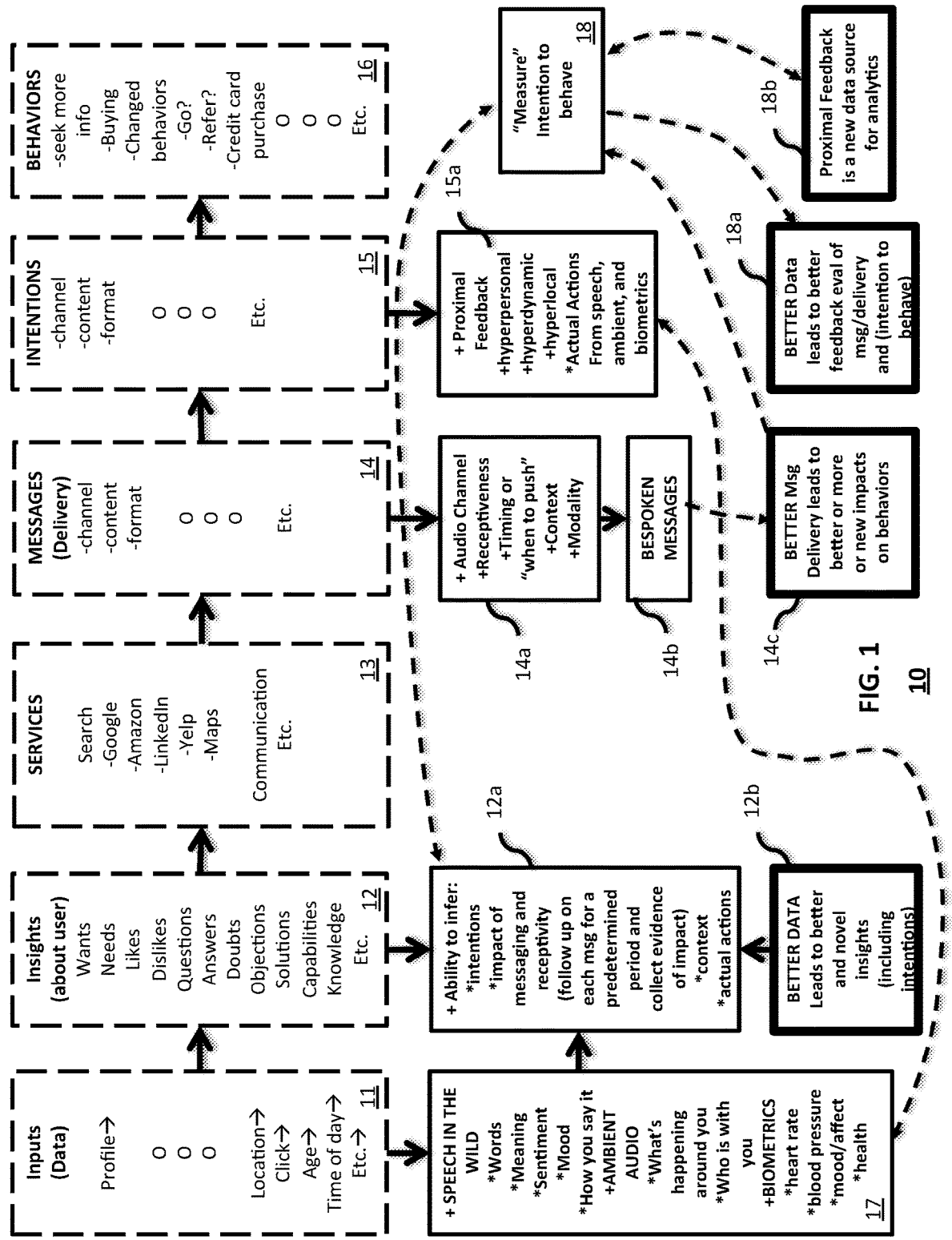
FIG. 1 is a block diagram of a message delivery and presentation system according to an embodiment of the present embodiments.

Aspects of the present embodiments include methods, systems and devices for delivering, receiving, or presenting messages based on a notion of receptivity. Making a measurement of receptivity can be modeled in many different ways. One model can look at how a number of contextual factors interact to create a value or threshold that can be used to determine a recipient's receptivity to an interruption with a message. Many of the factors considered can include the relevancy of the interruption to the current tasks a recipient may be performing or the form of interruption. Other factors can view experiences involved with mobile Human Computer Interaction (HCI) and how such interactions interplay with our day to day activities at home, work, in transit or in numerous other contexts. The embodiments herein can further take advantage of the many hardware and software features that have been incorporated into mobile phone devices and yet other hardware and software enhancements yet to come. Some of the embodiments can further take advantage of form factors in mobile devices that can include body worn devices that monitor biometric or physiological data. Future embodiments can also include implantable devices that perform existing biometric and physiological measurements and others measurements that are more appropriate for implantable configurations. Computing devices must evolve to adapt to human behaviors and to human contexts. Embodiments herein will account for considerations in psychology, computer science, and human behavior in general.

The embodiments herein take the notion of context-aware computing a step further by monitoring a different number of factors that attempt to mimic or even anticipate the psyche of the individual recipient before a message is delivered or presented such that a message is delivered at a more opportune time. Multimodal sensors can be used to determine a cognitive load of a recipient to avoid interruptions at inopportune times and to present messages that might be considered interrupting at more appropriate or opportune times where a recipient may be more receptive to viewing and hopefully acting upon the received message. In some embodiments, an Experience-Sampling Method (ESM) can be used to capture behavior responses to interruptions.

Mobile devices enable a window into a user's context in situ as they maneuver through daily activities to an extent unavailable before. Improvements in battery life, device size, human interaction, device interaction, memory, and interfacing with human and social elements enable a better view into contextual interactions that can affect receptivity to an interruption. The individual experience of mobile interactions with a device in a historical and current sense along with spatial and temporal location and orientation can only enhance the ability of a device or system predict or "measure" receptivity to a message or interruption. As many advancements in technology have enhanced our senses (our vision through microscopes, telescopes, or corrective lenses or our hearing through hearing aids), the embodiments herein enable users to mediate through the experiences of life though multiple advances in technology to provide a rich contextual awareness simulating or at least approaching the lofty goals of artificial intelligence.

Mobile devices in smaller packages such as earpieces invite additional factors to consider that may have not been contemplated before. Traditional phones are particularly interruptive as they may require the use of one's hands to interact in one or more contexts. Hands-free options utilizing earpieces can enable a user to refocus or stay focused and maintain attention to a task at hand (such as driving) without diverting attention to a screen or keyboard or other user interface. Other external factors can be considered to determine or predict a user's cognitive load such as biometric readings and/or erratic speeds or weaving (suggestive of stop and go traffic or actual traffic data based on location information) and/or acoustic information captured from inside or outside a vehicle cabin. In one example, the recognition of a clicking sound captured by a microphone on a phone (or a vehicle cabin) for a turning signal can suggest an inopportune time for an interruption. In another example, a user involved in a phone call or in a conversation with another passenger may not want be interrupted with a message. Other factors certainly include the subject matter and relationship of the sender of the message to the recipient. If the person calling or messaging is involved or related to a calendared event that is upcoming, such an interruption may receive a higher priority or greater receptivity based on "nearness" of the time of the event or meeting. Thus a device or system may need to negotiate or mediate several considerations in light of cognitive load and urgency. The further away a meeting may be in terms of time, the less pressure there may be to interrupt. In general, a mobile environment exacerbates the cognitive loading a user experiences due to the user's need to negotiate the varying orientation of their transit. The more factors that appear to be in a steady state, the more cognitive resources are presumed to be available to provide attention to a possible interruption. Thus, driving at a steady speed on the highway in a relatively quiet vehicle cabin or in a vehicle cabin with a steady sound pressure level due to a relatively steady wind or road noise may suggest an opportune time for an interruption and hence a higher receptivity level. If the user is somehow interfacing with their device, such as typing on touch a screen or monitoring a navigation output, then the receptivity may be reduced.

In other considerations, the embodiments can account for the relationship of an interruption to a task or a primary task. An interruption can be defined as an externally generated randomly occurring, discrete event that breaks the continuity of a cognitive focus on a primary task. A primary task can be defines as a well defined activity that constitutes the current "job" for a knowledge worker. An interruption task can be defined as any event or activity that demands attention to be redirected from the primary task toward an interruption task, forcing a task-switch. Another definition of an interruption task can be a new activity, or a collection of cognitive processes, which are instigated by the occurrence of an interruption. Thus, receptivity can be understood as a measure of receptiveness relating to communication for which consideration of the sender and the content of the interruption are significant. In terms of communication models, it places the recipient into the focus of attention. Receptivity accounts for the moment-by-moment negotiation of context as an interactional achievement and the inherent difficulty to predict opportune moments for interruptions. Thus, determining receptivity is much more involved than determining interruptability since it caters to the subjective viewpoint of the recipient and how such recipient in a given context would process such interruption.

There are four fundamental ways to respond to an interruption once detected (e.g. heard, seen, felt):
1. Take-up with full compliance: Handle the interruption immediately.
2. Take-up with alteration: Acknowledge the interruption and prospectively agree to handle it later, e.g. by making a mental note, or by adding an item to a TODO list.
3. Decline: Explicitly refuse to handle the interruption, e.g. by refusing a call.
4. Withdraw: Implicitly refuse to handle the interruption by ignoring it.

Also, the manner in which the interruption is provided can affect receptivity and should also be considered with respect to cognitive load and social contexts. For example, a device can switch between modes such as a silent alert mode (that provides a flash or other visual indicator), a tactile alert or vibration alert, and a ringing alert depending on the perceived cognitive load (based on biometrics or acoustic environment or perceived social context or surroundings).

Further note that there are four primary methods to coordinate interruptions that include immediate, negotiated, scheduled, and mediated interruptions. An immediate strategy has the interruption presented immediately and disrupts the recipient's primary task. A negotiated interruption is announced by notification, where the recipient retains control when to accept the interruption. A scheduled interruption is delivered according to a prearranged schedule and a mediated interruption uses a mediating agent that is notified of the interruption request and where the agent then decides when and how to interrupt. Most of the embodiments would likely incorporate negotiated and mediated interruption strategies to reduce cognitive load and yet provide higher overall levels of receptivity to messages.

Another key factor for determining receptivity can include determining breakpoints in cognitive task processing. One presumption is that a user is less likely to want to be interrupted in the middle of a primary task or possibly a subtask, but is more likely to process an interruption or message if the message is presented during a breakpoint between tasks. Thus, breakpoints can provide possible insight to a level of receptivity since receptivity involves one's willingness to be interrupted. Receptivity also involves models of human communication that can take into account a number of factors as to WHO, SAYS WHAT, IN WHICH CHANNEL, TO WHOM, and WITH WHAT EFFECT? WHO is the recipient's relation to the sender of the interruption. For example, does the recipient trust the sender, what is their authority, status, affiliation etc.? SAYS WHAT is the recipient's relation to the content of the interruption, e.g., is it relevant, urgent, interesting etc. to the recipient? IN WHICH CHANNEL is the recipient's relation to the medium of the interruption, e.g., is the recipient more receptive to a call or an SMS? TO WHOM is the recipient's current involvement, e.g. what am I doing? WITH WHAT EFFECT is the anticipated/actual effects of the interruption on the recipient, e.g. does the interruption trigger an activity? Contextual factors of an interruption include relational contextual factors that include properties of the interruption including WHO, SAYS WHAT, IN WHICH CHANNEL, as well as the form of presentation, and the timing of the interruption as to when it is delivered and when it is noticed. Local contextual factors further consider the physical environment (properties or norms of the space or place), embodied factors relating to physical and cognitive activity as to what a recipient may be involved with at the moment, and social environment that considers who else may be present and whether a certain action is appropriate. What the recipient may be involved with at the moment can be a task that may have certain levels cognitive loading base on a number of factors such as mental demand, physical demand, temporal demand, performance, effort and frustration to name a few.

In some embodiments, an Experience-Sampling Method is utilized to prompt participants with a signaling device to fill out questionnaires about their current experience over longer periods of time to enable to enhance and refine such a system for receptivity. In other embodiments, the system can track the effect or reaction of the user/recipient and make a determination or measure of receptivity based on certain follow-up metrics that can involve biometric readings, behavioral patterns, keyword recognition affirming receptiveness to the message, web surfing patterns, or purchase patterns as examples.

Notwithstanding the factors noted above, the content and time of delivery plays a significant role in determining receptivity. Factors related to content quality include the factors of interest, entertainment, relevance, and actionability. Time of delivery including the time of day of delivery plays an important role. Timing that predicts or caters to situational information needs also can effect receptivity. Weather and traffic information certainly plays a role as one travels or is about to travel.

Other factors to consider are locations that are designed or conducive to higher receptivity. Such locations can include "break zones" such as parks, cafes, rest stops, picnic areas and the like. Yet other considerations are information overloading and habituating where notifications are increasingly ignored over a period of time that can include the span of just one day or less.

The embodiments herein are generally trying to determine the opportune moment for an interruption so that the recipient would be receptive to the interruption (e.g., message). In considering the interplay of local and relational contextual factors including tasks, a worst case may be when a recipient has already endeavored on to a new task or has entered a cognitive planning phase for the task. An intermediate case is when the recipient has just finished a sub-task within a larger primary task. A best case can involve the scenario where a task has been completed and a breakpoint within the recipient's activity context is reached. The structure and shape of cognitive activity, and breakpoints within it to pinpoint opportune moments may be among the hardest things to measure or predict for context-aware systems. Yet, an accurate estimation of the recipient's current involvement as a result of their physical and cognitive activity, their history, emotions, affect, beliefs, desires and intentions would appear likely to be the most powerful and accurate way of predicting an opportune moment for an interruption. The embodiments herein attempt to predict and measure such opportune moments using multimodal metrics that provide a window into cognitive loading.

In one embodiment, a system includes one or more sensors for measuring a multimodal metric, a memory having computer instructions, and one or more processors operatively coupled to the one or more sensors and the memory. The one or more processors when executing the computer instructions cause the one or more processors to perform operations such as analyzing the multimodal metric to provide an analysis and determine a receptivity to a message, and delivering or receiving or presenting the message at a period of time when the receptivity is over a predetermined threshold based on the analysis. Receptivity to a message can be measured in many different ways including the use of the one or more sensors such one or more microphones used for determining a cognitive load of a recipient. In some embodiments, the one or more sensors can include at least a microphone for determining an existence of speech and for determining a context or a cognitive load. In yet other embodiments, the one or more sensor can include at least a microphone and a biometric sensor for determining the cognitive load. A biometric sensor can include, but is not limited to sensors that measure temperature, heart rate, perspiration, pulse, blood pressure, EEG, PPG, blood oxygenation, breathing rates, or brainwaves to name a few.

Referring to FIG. 1, a system 10 utilizes a number of inputs and contextual factors that may be measured or inferred from various sources as shown. The system 10 further includes a feedback or learning mechanism that measures the intention to behave or act upon received messages which can also provide a measure of receptivity for a message. The inputs and contextual factors include data inputs 11 that can come from a user profile (e.g., age, gender, likes, dislikes, etc.), or from location sensors (e.g., GPS, beacons, triangulation, etc.), clicking activity or web surfing activity, time of day, etc. If such information are not explicit from a profile, other insights 12 of the user can be gathered or inferred that include their wants, needs, likes, and dislikes. Such information can be inferred for a user from their own or third party questions, answers, doubts, objections, solutions, capabilities, knowledge or other information that may have been given or sought. The inputs can further include other inputs 17 such as speech or voice from microphones and (speech-to-text) processors that capture speech in the wild to determine key words, meaning, sentiment, and mood and that can further analyze ambient audio to determine what is happening around the user. The other inputs 17 can also include one or more biometric sensors that measure temperature, heart rate, perspiration, pulse, blood pressure, EEG, PPG, blood oxygenation, breathing rates, or brainwaves to name a few. The various inputs (11, 12, 17, etc.) can be fed to an inference engine that can predict or make a measure of intentions that would have an impact or messaging and receptivity. Feedback from various sources (12b, 15a, 18, etc.) relating to each message that provides evidence of impact from the message including context and actual actions provides better data leading to better and novel insights about the user and their intentions. [0054] The term "profile" relates to a summary of noteworthy characteristics and/or habits of an individual or group of individuals. These characteristics may be physiological (health-related), environmental, statistical, demographical, behavioral, and the like. Age, location, gender, sex, weight, ethnicity, and/or height may be included in a profile. The profile and the aforementioned characteristics and/or habits can be used in the context of social media and further information in the interactions within a social media network can be extracted to form a part of a profile as well Additionally, a profile may reference the buying and/or spending habits of an individual or group and can further include a credit rating. Profiles may be utilized in making predictions about an individual or group.

The services 13 and corresponding user profiles and interplay with social networks or websites or online purchasing communities (e.g., Google, Amazon, LinkedIn, Yelp, Maps, eBay) provides further context. The messages 14 themselves (e.g., their content), the channels of delivery, and the format of the message provide further insight and context. The channels, content, and format of messages can be assessed and analyzed for receptivity at 14a and bespoken messages at 14b can be assessed and analyzed to provide a greater measure of receptivity or at least a greater confidence level that a particular message, message delivery mode, channel, or format had an intended or better impact. Intentions correlated to message channel, content and format can also be measured or extracted at 15 and 15a and compared with speech, ambient sound, and biometrics captured at 17. Behaviors such as buying patterns, credit card purchases, visits to websites or actual brick-and-mortar stores at 16 can also be used to measure receptivity and further measure impact. Various forms of feedback (18a, 18b, 14c, etc.) can be used to evaluate an intention to behave based on receipt of a message, which is a measure of receptivity.

Figure 2:
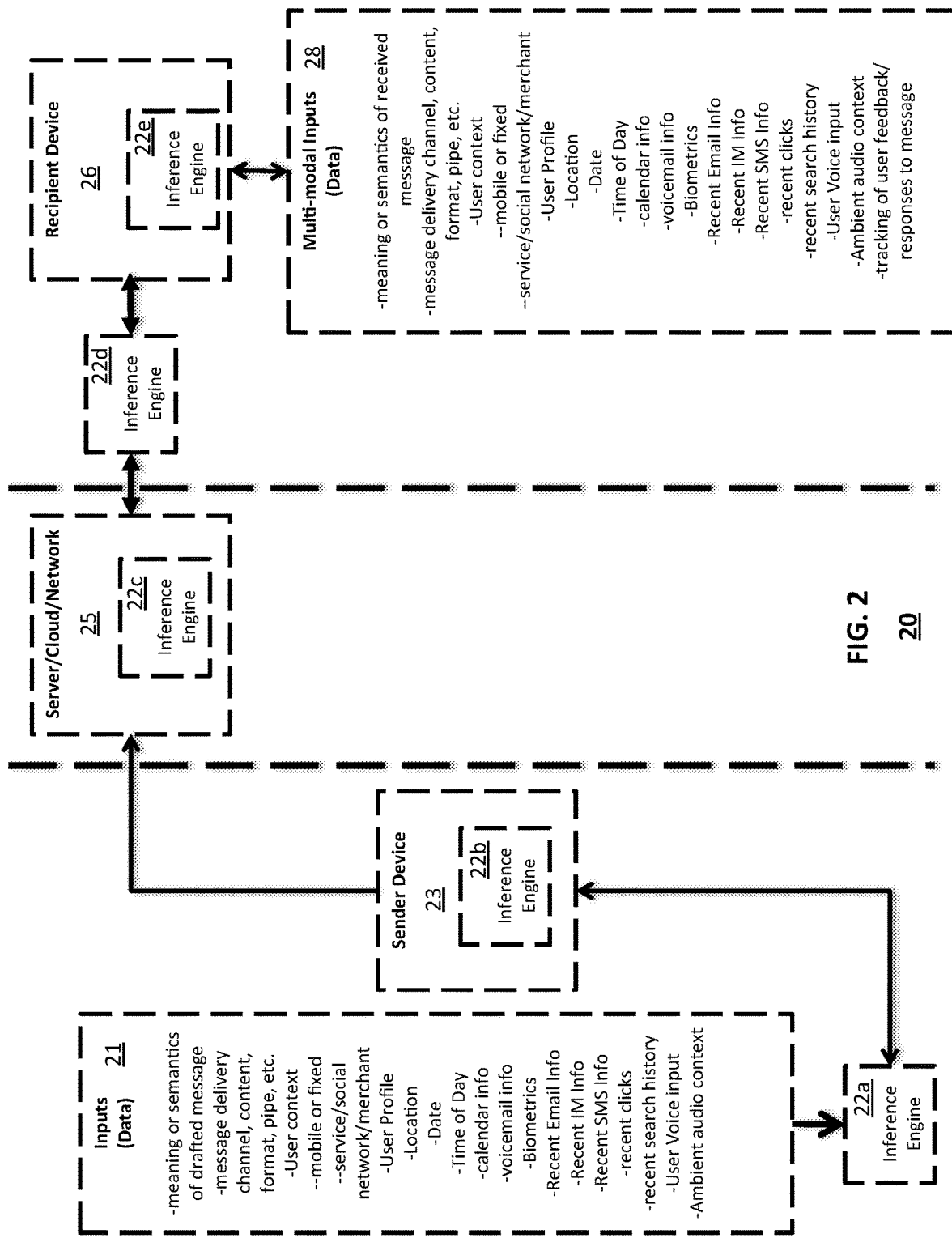
FIG. 2 is another block diagram of a message delivery and presentation system according to an embodiment of the present embodiments.

Referring to FIG. 2, another system 20 is shown that includes one or more inference engines (22a, 22b, 22c, 22d, and/or 22e) used for measuring a level of receptivity. The one or more inference engines can be located within (22b) a sender device 23 or operatively coupled (22a) to the sender device. The one or more inference engines (22c) can reside within a server, cloud or network 25 or within (22e) a recipient device 26. The inference engine can also be operatively coupled (22d) to the recipient device 26. Numerous inputs 21 can be provided at the sender's end that can impact receptivity. Such inputs include, but are not limited to the meaning or semantics of a drafted message, a message delivery channel, content, format, pipe, etc., a User context, a mobile or fixed environment, a service/social network/merchant, a User Profile, a Location, a date, a time of day, calendar information, voicemail information, biometrics, recent email information, recent IM information, recent SMS information, recent clicks, recent search history, user voice input, or ambient audio content. More importantly, multimodal inputs 28 at the recipient device includes many of the same inputs considered above with respect to the recipient device. The meaning or semantics of the receive message is considered, but further tracking of user feedback or tracking of responses to messages are used assess receptivity for current message and for refinement of receptivity measures for future messages or interruptions.

Referring to FIG. 3, an inference engine 22 as may be used in the systems of FIGS. 1 and 2 performs an analysis of inputs to determine context and cognitive load. In some embodiments, the inference engine 22 determines the existence of speech and context/cognitive load/and receptivity. In other embodiments, the inference engine determines receptivity to a particular message and/or message format or measures intention to adopt message directive or suggestion. In some embodiments, the inference engine 22 uses acoustics/microphones to analyze recipient user speech and ambient speech or speech in the wild which can include speaker ID. In some embodiments, the inference engine analyzes speech and speech in the wild for words, meaning, content, sentiment, mood. In other embodiments, the inference engine 22 analyzes acoustics for non-speech context (sound signatures indicating a particular context (clicking turn indicator, siren, whispering, screaming, etc.). In some embodiments, the inference engine 22 uses biometric sensors to measure heart rate, blood pressure, EEG, BCG, PPG, mood, etc. In some embodiments, the inference engine 22 uses location sensors, motion sensors, proximity sensors, beacons to determine context for appropriateness of presenting messages or of a particular format of message or uses a recipient profile for message format preferences and temporal delivery/presentation preferences. In some embodiments, the inference engine 22 mines and uses data from recipient applications and services such as calendar, email, SMS, chat, IM, voicemail, social network (likes, dislikes, buddy lists), web service, browser, maps, navigation services, restaurant rating service, movie rating service, or other device, network, or web application to infer context, receptivity, and state of mind of recipient. In some embodiments, the inference engine mines and uses data from online businesses including purchase histories, browsing histories, wish lists, shopping cart entries (whether items are purchased or not), etc or mine and uses data from merchant services, banks, and other financial institutions. In some embodiments, the inference engine tracks and correlates subsequent behavior to presentation or delivery of messages including confirmation of receptivity to a particular message or a particular message format or message type or delivery mode or a message characteristic using one or more of acoustics, biometric sensors, location sensors, motion sensors, proximity sensors, beacons, changes to recipient profiles, data from recipient applications or services or from merchant services, banks or other financial institutions. Note, the message type or format can include, but is not limited to: visual messages, audio messages, audio-visual messages, videos, still images, textual messages. Message characteristics can include, but is not limited to: gender, color, volume, frequency, high motion video, low motion video, static image, or a genre.

Figure 4:
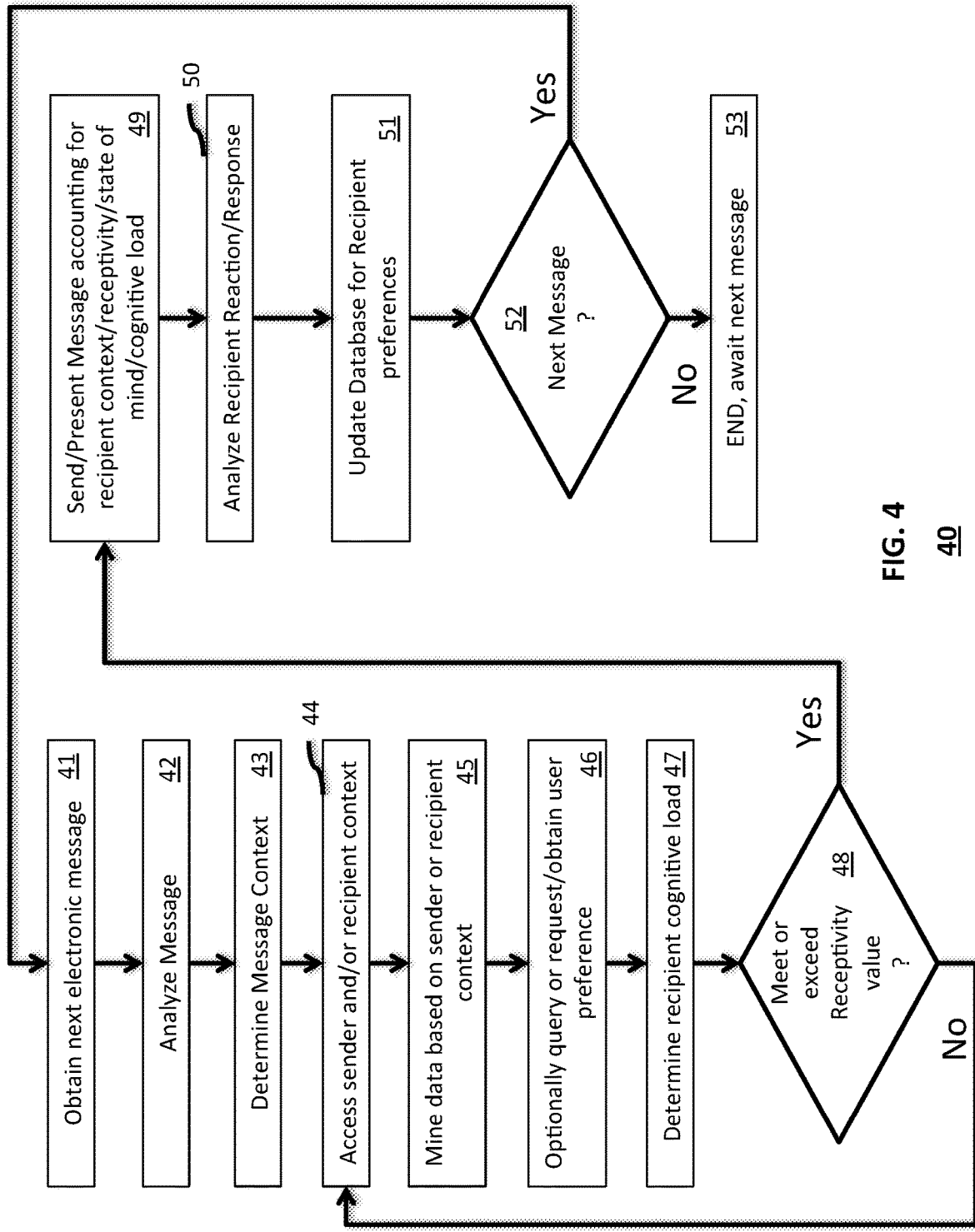
FIG. 4 is a flow chart illustrating a method in accordance with the present embodiments.

Referring to FIG. 4, a flow chart illustrating a method 40 in accordance with the embodiments includes the step 41 of obtaining a next electronic message. The message is analyzed at step 42. At step 43, the message context is determined. At step 44, the sender and/or recipient context is accessed and the data is mined based on the sender or recipient context at step 45. At method optionally queries or requests or obtains the user's preference at step 46. At step 47, the method 40 determines the recipient cognitive load as explained above. At decision block 48, various contextual factors including a recipient contextual load is used to determine if a recipient meets or exceeds a receptivity value. If the receptivity value is not met or exceeded, then the method 40 can continue to access sender and/or recipient context information (or alternatively stop). If the receptivity value is met or exceeded at decision block 48, then the method sends or presents the message accounting for the recipient context, receptivity, state of mind or cognitive load of the recipient. Base on the various factors impacting the recipient, the message can be presented in a certain, channel or mode or in a certain format. At step 50, the recipient reaction or response to the message is analyzed. Based on the analysis, the database for recipient preferences (possibly in terms of message channel, mode, or format) can be updated. At decision block 52, if a next message is awaiting, then the method returns to step 41. Otherwise, the method ends at 53.

In some embodiments, the one or more sensors includes at least an acoustic sensor that operates cooperatively with at least one of a calendar, a texting memory, an email memory, a voicemail memory, or a location sensor to determine a state of being or a cognitive load of a message recipient. In some embodiments, the system includes the one or more processors further tracking responses to the receipt of the message and ranking the receptivity of a type or a characteristic of the message. The type of message can be at least one of a visual message, a audio message, an audiovisual message, or a textual message and a characteristic of the message can be at least one of a gender, a color, a volume, a frequency, a high motion, a low motion, a static image, or a genre.

In some embodiments, the one or more processors form an inference engine as shown in FIGS. 1-3 that provides a confidence level of a receptiveness of a user to receive a presentation of a message of a particular format at a particular time based on contexts inferred from the multimodal metrics. In some embodiments, the one or more processors form an inference engine that provides a confidence level of a receptiveness of a user to receive a presentation of a message of a particular format at a particular time based on contexts inferred from the multimodal metrics and further tracks and correlates the receptiveness based on subsequent multimodal inputs to update the confidence level.

Figure 5:
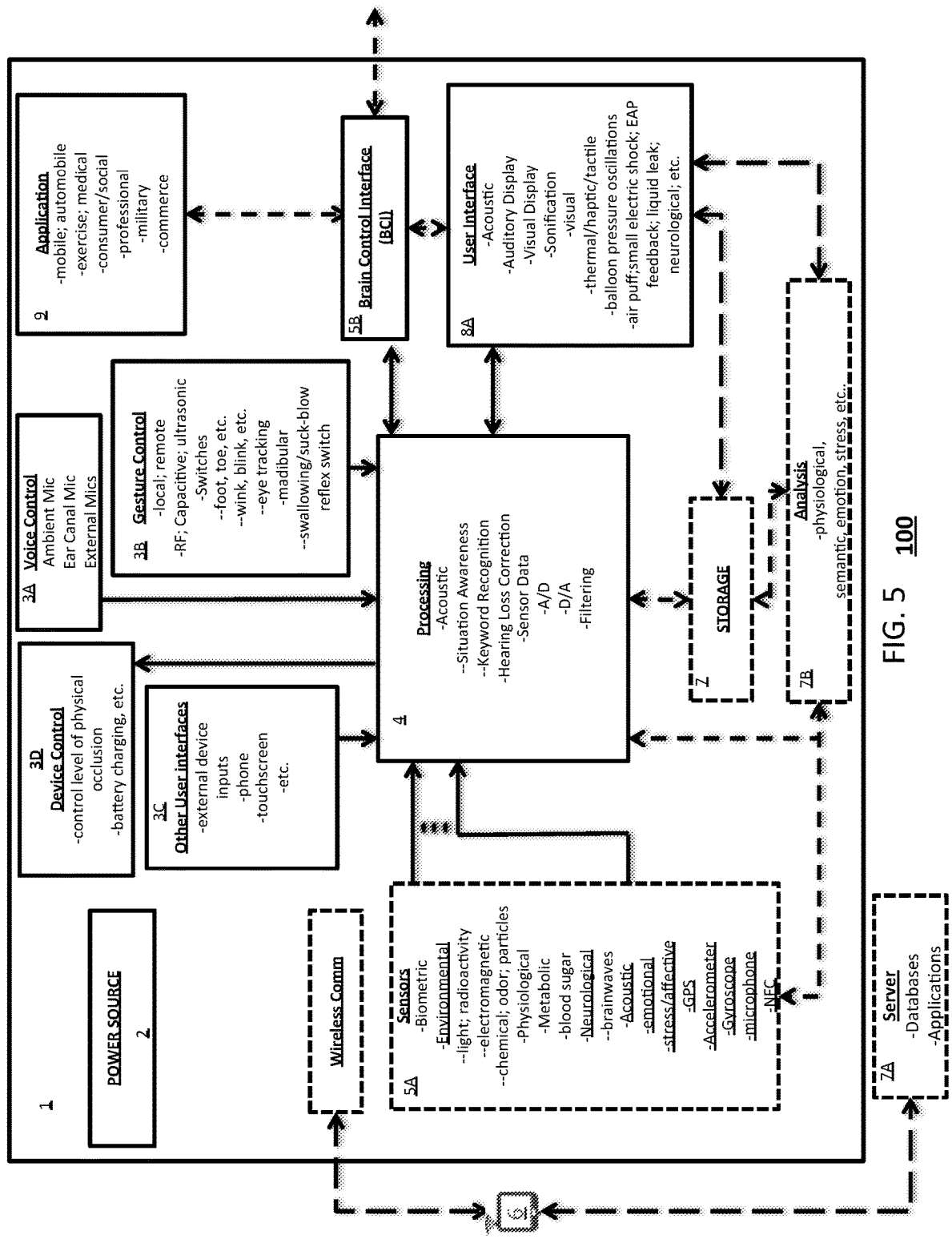
FIG. 5 is a block diagram of a device in accordance with the present embodiments.

Referring to FIG. 5, a device 1 that is part of a system 100, includes local or remote memory, local or remote databases, and features for recording can all be represented by the storage device 7 or 7A which can be coupled to an analysis module 7B. The device can be powered by a power source 2. The device 1 can include one or more processors 4 that can process a number of acoustic channels and process such channels for situational awareness and/or for keyword or sound pattern recognition, as well as daily speech the user speaks, coughs, sneezes, etc. to determine context and/or cognitive load. The processor(s) 4 can provide for hearing loss correction and prevention, process sensor data, convert signals to and from digital and analog and perform appropriate filtering as needed. In some embodiments, the processor 4 is formed from one or more digital signal processors (DSPs). The device can include one or more sensors 5A or 5B operationally coupled to the processor 4. The sensors can be biometric and/or environmental. Such environmental sensors can sense one or more among light, radioactivity, electromagnetism, chemicals, odors, or particles. The sensors can also detect physiological changes or metabolic changes. In some embodiments, the sensors can include electrodes or contactless sensors and provide for neurological readings including brainwaves. The sensors can also include transducers or microphones for sensing acoustic information. Other sensors can detect motion and can include one or more of a GPS device, an accelerometer, a gyroscope, a beacon sensor, or NFC device. One or more sensors can be used to sense emotional aspects such as stress or other affective attributes. In a multimodal, multisensory embodiment, a combination of sensors can be used to make emotional or mental state assessments or other anticipatory determinations. The sensors alone or in combination with other information can be used to determine cognitive load of a recipient and to determine receptivity.

User interfaces can be used alone or in combination with the aforementioned sensors to also more accurately make emotional or mental state assessments or other anticipatory determinations. A voice control module 3A can include one or more of an ambient microphone, an ear canal microphone or other external microphones (e.g., from a phone, lap top, or other external source) to optionally control the functionality of the device 1 to provide a myriad of control functions such as retrieving search results (e.g., for information, directions) or to conduct transactions (e.g., ordering, confirming an order, making a purchase, canceling a purchase, etc.), or to activate other functions either locally or remotely (e.g., turn on a light, open a garage door). The use of an expandable element or balloon (not shown) for sealing an ear canal can be strategically used in conjunction with an ear canal microphone (in the sealed ear canal volume) to isolate a user's voice attributable to bone conduction and correlate such voice from bone conduction with the user's voice picked up by an ambient microphone. Through appropriate mixing of the signal from the ear canal microphone and the ambient microphone, such mixing technique can provide for a more intelligible voice substantially free of ambient noise that is more recognizable by voice recognition engines such as SIRI by Apple, Google Now by Google, or Cortana by Microsoft.

The voice control interface 3A can be used alone or optionally with other interfaces that provide for gesture control 3B. Alternatively, the gesture control interface(s) 3B can be used by themselves. The gesture control interface(s) 3B can be local or remote and can be embodied in many different forms or technologies. For example, a gesture control interface can use radio frequency, acoustic, optical, capacitive, or ultrasonic sensing. The gesture control interface can also be switch-based using a foot switch or toe switch. An optical or camera sensor or other sensor can also allow for control based on winks, blinks, eye movement tracking, mandibular movement, swallowing, or a suck-blow reflex as examples.

The processor 4 can also interface with various devices or control mechanisms within the ecosystem of the device 1. For example, the device can include various valves that control the flow of fluids or acoustic sound waves. More specifically, in one example the device 1 can include a shutter or "aural iris" in the form of an electro active polymer or other mechanical shutter that controls a level or an opening size that controls the amount of acoustic sound that passes through to the user's ear canal. In another example, the processor 4 can control a level of battery charging to optimize charging time or optimize battery life in consideration of other factors such as temperature or safety in view of the rechargeable battery technology used.

A brain control interface (BCI) 5B can be incorporated in the embodiments to allow for control of local or remote functions including, but not limited to prosthetic devices. In some embodiments, electrodes or contactless sensors in the balloon of an earpiece can pickup brainwaves or perform an EEG reading that can be used to control the functionality of the earpiece itself or the functionality of external devices. The BCI 5B can operate cooperatively with other user interfaces (8A or 3C) to provide a user with adequate control and feedback. In some embodiments, the earpiece and electrodes or contactless sensors can be used in Evoked Potential Tests. Evoked potential tests measure the brain's response to stimuli that are delivered through sight, hearing, or touch. These sensory stimuli evoke minute electrical potentials that travel along nerves to the brain, and can be recorded typically with patch-like sensors (electrodes) that are attached to the scalp and skin over various peripheral sensory nerves, but in these embodiments, the contactless sensors in the earpiece can be used instead. The signals obtained by the contactless sensors are transmitted to a computer, where they are typically amplified, averaged, and displayed. There are 3 major types of evoked potential tests including: 1) Visual evoked potentials, which are produced by exposing the eye to a reversible checkerboard pattern or strobe light flash, help to detect vision impairment caused by optic nerve damage, particularly from multiple sclerosis; 2) Brainstem auditory evoked potentials, generated by delivering clicks to the ear, which are used to identify the source of hearing loss and help to differentiate between damage to the acoustic nerve and damage to auditory pathways within the brainstem; and 3) Somatosensory evoked potentials, produced by electrically stimulating a peripheral sensory nerve or a nerve responsible for sensation in an area of the body which can be used to diagnose peripheral nerve damage and locate brain and spinal cord lesions The purpose of the Evoked Potential Tests include assessing the function of the nervous system, aiding in the diagnosis of nervous system lesions and abnormalities, monitoring the progression or treatment of degenerative nerve diseases such as multiple sclerosis, monitoring brain activity and nerve signals during brain or spine surgery, or in patients who are under general anesthesia, and assessing brain function in a patient who is in a coma. In some embodiments, particular brainwave measurements (whether resulting from Evoked Potential stimuli or not) can be correlated to particular thoughts and selections to train a user to eventually consciously make selections merely by using brainwaves. For example, if a user is given a selection among A. Apple B. Banana and C. Cherry, a correlation of brainwave patterns and a particular selection can be developed or profiled and then subsequently used in the future to determine and match when a particular user merely thinks of a particular selection such as "C. Cherry". The more distinctively a particular pattern correlates to a particular selection, the more reliable the use of this technique as a user input.

User interface 8A can include one or more among an acoustic output or an "auditory display", a visual display, a sonification output, or a tactile output (thermal, haptic, liquid leak, electric shock, air puff, etc.). In some embodiments, the user interface 8A can use an electroactive polymer (EAP) to provide feedback to a user. As noted above, a BCI 5B can provide information to a user interface 8A in a number of forms. In some embodiments, balloon pressure oscillations or other adjustments can also be used as a means of providing feedback to a user. Also note that mandibular movements (chewing, swallowing, yawning, etc.) can alter balloon pressure levels (of a balloon in an ear canal) and be used as way to control functions. (Also note that balloon pressure can be monitored to correlate with mandibular movements and thus be used as a sensor for monitoring such actions as chewing swallowing and yawning).

Other user interfaces 3C can provide external device inputs that can be processed by the processor(s) 4. As noted above, these inputs include, but are not limited to, external device keypads, keyboards, cameras, touch screens, mice, and microphones to name a few.

The user interfaces, types of control, and/or sensors may likely depend on the type of application 9B. In a mobile application, a mobile phone microphone(s), keypad, touchscreen, camera, or GPS or motion sensor can be utilized to provide a number of the contemplated functions. In a vehicular environment, a number of the functions can be coordinated with a car dash and stereo system and data available from a vehicle. In an exercise, medical, or health context, a number of sensors can monitor one or more among, heart beat, blood flow, blood oxygenation, pulse oximetry, temperature, glucose, sweat, electrolytes, lactate, pH, brainwave, EEG, ECG or other physiological, or biometric data. Biometric data can also be used to confirm a patient's identity in a hospital or other medical facility to reduce or avoid medical record errors and mix-ups. In a social networking environment, users in a social network can detect each other's presence, interests, and vital statistics to spur on athletic competition, commerce or other social goals or motivations. In a military or professional context, various sensors and controls disclosed herein can offer a discrete and nearly invisible or imperceptible way of monitoring and communicating that can extend the "eyes and ears" of an organization to each individual using an earpiece as described above. In a commercial context, a short-range communication technology such as NFC or beacons can be used with other biometric or gesture information to provide for a more robust and secure commercial transactional system. In a call center context or other professional context, the earpiece could incorporate a biosensor that measures emotional excitement by measuring physiological responses. The physiological responses can include skin conductance or Galvanic Skin Response, temperature and motion. The sensors can provide an multimodal metric for determining receptivity to a message which may include a determination of cognitive load and/or context.

In yet other aspects, some embodiments can monitor a person's sleep quality, mood, or assess and provide a more robust anticipatory device using a semantics acoustic engine with other sensors. The semantic engine can be part of the processor 4 or part of the analysis module 7D that can be performed locally at the device 1 or remotely as part of an overall system. If done remotely at a remote server, the system 1 can include a server (or cloud) that includes algorithms for analysis of gathered sensor data and profile information for a particular user. In contrast to other schemes, the embodiments herein can perform semantic analysis based on all biometrics, audio, and metadata (speaker ID, etc.) in combination and also optionally in a much "cleaner" environment within a sealed EAC sealed by a proprietary balloon that is immune to many of the detriments in other schemes used to attempt to seal an EAC.

Depending on the resources available at a particular time such as processing power, semantic analysis applications, or battery life, the semantic analysis would be best performed locally within a monitoring earpiece device itself, or within a cellular phone operationally coupled to the earpiece, or within a remote server or cloud or a combination thereof.

Though the methods herein may apply broadly to a variety of form factors for a monitoring apparatus, in some embodiments herein a 2-way communication device in the form of an earpiece with at least a portion being housed in an ear canal can function as a physiological monitor, an environmental monitor, and a wireless personal communicator. Because the ear region is located next to a variety of "hot spots" for physiological an environmental sensing—including the carotid artery, the paranasal sinus, etc.—in some cases an earpiece monitor takes preference over other form factors. Furthermore, the earpiece can use the ear canal microphone to obtain heart rate, heart rate signature, blood pressure and other biometric information such as acoustic signatures from chewing or swallowing or from breathing or breathing patterns. The earpiece can take advantage of commercially available open-architecture, ad hoc, wireless paradigms, such as Bluetooth®, Wi-Fi, or ZigBee. In some embodiments, a small, compact earpiece contains at least one microphone and one speaker, and is configured to transmit information wirelessly to a recording device such as, for example, a cell phone, a personal digital assistant (PDA), and/or a computer. In another embodiment, the earpiece contains a plurality of sensors for monitoring personal health and environmental exposure. Health and environmental information, sensed by the sensors is transmitted wirelessly, in real-time, to a recording device or media, capable of processing and organizing the data into meaningful displays, such as charts. In some embodiments, an earpiece user can monitor health and environmental exposure data in real-time, and may also access records of collected data throughout the day, week, month, etc., by observing charts and data through an audio-visual display. Note that the embodiments are not limited to an earpiece and can include other body worn or insertable or implantable devices as well as devices that can be used outside of a biological context (e.g., an oil pipeline, gas pipeline, conduits used in vehicles, or water or other chemical plumbing or conduits). Other body worn devices contemplated herein can incorporate such sensors and include, but are not limited to, glasses, jewelry, watches, anklets, bracelets, contact lenses, headphones, earphones, earbuds, canal phones, hats, caps, shoes, mouthpieces, or nose plugs to name a few. In addition, all types of body insertable devices are contemplated as well.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

Those with ordinary skill in the art may appreciate that the elements in the figures are illustrated for simplicity and clarity and are not necessarily drawn to scale. For example, the dimensions of some of the elements in the figures may be exaggerated, relative to other elements, in order to improve the understanding of the present invention.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed:

1. A system, comprising:
   one or more sensors for measuring a multimodal metric;
   a memory having computer instructions; and
   one or more processors operatively coupled to the one or more sensors and the memory, the one or more processors when executing the computer instructions cause the one or more processors to perform operations comprising:
   analyzing the multimodal metric to provide an analysis;
   capturing and analyzing speech to determine a keyword, a meaning, a sentiment, a mood, or a combination thereof, associated with the speech;
   determining a receptivity to a message based on the analysis of the multimodal metric and based on the analyzed speech, wherein the receptivity to the message is determined based on a measured intent to behave or act upon the message;
   determining an impact of the message on a user based on the multimodal metric;
   delivering or receiving or presenting the message at a period of time when the receptivity is over a predetermined threshold based on the analysis, wherein the receptivity is determined to be over the predetermined threshold based on both a contextual load and a cognitive load associated with the user, wherein the message is delivered, received, or presented using a mode or format that is based on the impact; and
   wherein the one or more processors form an inference engine that provides a confidence level of a receptiveness of a user to receive a presentation of a message of a particular format at a particular time based on contexts inferred from the multimodal metrics and further tracks and correlates the receptiveness based on subsequent multimodal inputs to update the confidence level.

2. The system of claim 1, wherein the one or more sensors comprise at least a microphone used for determining the cognitive load.

3. The system of claim 1, wherein the one or more sensors comprises at least a microphone used for determining an existence of speech and for determining a context or the cognitive load.

4. The system of claim 1, wherein the one or more sensors comprises at least a microphone and a biometric sensor for determining the cognitive load.

5. The system of claim 1, wherein the one or more sensors comprises at least an acoustic sensor that operates cooperatively with at least one of a calendar, a texting memory, an email memory, a voicemail memory, or a location sensor to determine a state of being or the cognitive load of a message recipient.

6. The system of claim 1, wherein the one or more processors further perform the operations of tracking responses to the receipt of the message and ranking the receptivity of a type or a characteristic of the message.

7. The system of claim 6, wherein the type of message comprises at least one of a visual message, a audio message, an audio-visual message, or a textual message and a characteristic of the message comprises at least one of a gender, a color, a volume, a frequency, a high motion, a low motion, a static image, or a genre.

8. The system of claim 1, wherein the one or more processors form an inference engine that provides a confidence level of a receptiveness of a user to receive a presentation of a message of a particular format at a particular time based on contexts inferred from the multimodal metrics.

9. A system, comprising:
one or more sensors for accessing sensor data including at least a microphone used for determining a cognitive load;
a memory having computer instructions; and
one or more processors operatively coupled to the one or more sensors and the memory, the one or more processors when executing the computer instructions cause the one or more processors to perform operations comprising:
analyzing the sensor data to provide an analysis;
capturing and analyzing speech to determine a keyword, a meaning, a sentiment, a mood, or a combination thereof, associated with the speech;
determining a receptivity to a message based on the analysis of the sensor data and based on the analyzed speech, wherein the receptivity to the message is determined based on a measured intent to behave or act upon the message;
determining an impact of the message on a user based on a multimodal metric measured by the one or more sensors;
delivering or receiving or presenting the message at a period of time when the receptivity is over a predetermined threshold based on the analysis, wherein the receptivity is determined to be over the predetermined threshold based on both a contextual load and a cognitive load associated with the user, wherein the message is delivered, received, or presented using a mode or format that is based on the impact; and
wherein the one or more processors form an inference engine that provides a confidence level of a receptiveness of a user to receive a presentation of a message of a particular format at a particular time based on contexts inferred from the multimodal metrics and further tracks and correlates the receptiveness based on subsequent multimodal inputs to update the confidence level.

10. The system of claim 9, wherein the one or more processors further analyze at least one of a status of a current task, a relationship of a sender of the message to the recipient, a relevancy of the message sent to the recipient to the current task, a channel which the message is sent to the recipient, an effect of the message to the current task, or a social environment of the recipient.

11. The system of claim 9, wherein the cognitive load is based on one or more factors comprising mental demand, physical demand, temporal demand, performance, effort or frustration of a current activity.

12. The system of claim 9, wherein the one or more processors further analyze the message for content quality factors in relation to the recipient including one or more of interest, entertainment, relevance, and actionability.

13. The system of claim 9, wherein the one or more processors further analyze a current activity of the recipient to determine at least one of a status of a primary task, a status of a sub-task, or a physical or cognitive load of a particular primary task or sub-task.

14. The system of claim 9, wherein the one or sensors comprises at least one or more microphones and at least one or more biometric sensors.

* * * * *